(12) United States Patent
Ito

(10) Patent No.: US 7,873,539 B2
(45) Date of Patent: Jan. 18, 2011

(54) SALES SLIP PROCESSOR USING SALES SLIP PROCESSING METHOD, AND STORAGE MEDIUM USED FOR SALES SLIP PROCESSING METHOD

(75) Inventor: Masakazu Ito, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1072 days.

(21) Appl. No.: 11/259,106

(22) Filed: Oct. 27, 2005

(65) Prior Publication Data

US 2006/0111982 A1 May 25, 2006

(30) Foreign Application Priority Data

Oct. 27, 2004 (JP) .............................. 2004-312680

(51) Int. Cl.
G06Q 20/00 (2006.01)
G06Q 30/00 (2006.01)
G06Q 50/00 (2006.01)
E04H 3/04 (2006.01)
A63F 9/02 (2006.01)

(52) U.S. Cl. ............................. 705/16; 705/15; 186/38; 186/59

(58) Field of Classification Search .................. 705/16, 705/15
See application file for complete search history.

(56) References Cited

U.S. PATENT DOCUMENTS

| | | | | |
|---|---|---|---|---|
| 4,396,985 A | * | 8/1983 | Ohara | 705/15 |
| 4,415,065 A | * | 11/1983 | Sandstedt | 705/34 |
| 5,353,219 A | * | 10/1994 | Mueller et al. | 705/16 |
| 6,088,681 A | * | 7/2000 | Coleman et al. | 705/15 |
| 2003/0078793 A1 | * | 4/2003 | Toth | 705/1 |

(Continued)

FOREIGN PATENT DOCUMENTS

JP 07-175973 7/1995

(Continued)

OTHER PUBLICATIONS

Counterpoint introduces advanced ECR system for clubs pubs, and restaurants. News Release, p. 1. Sep. 10, 1991. (Retrieved via Dialog Quick Search on Sep. 11, 2010).*

(Continued)

*Primary Examiner*—Matthew S Gart
*Assistant Examiner*—Scott A Zare
(74) *Attorney, Agent, or Firm*—Young & Thompson

(57) ABSTRACT

In response to inputting order, a sales slip processor issues a sales slip with a slip code and a table code of a table at which the order is accepted, and stores order data in a sales holding file. In order to balance or rewrite sales slips, an operator inputs a sales slip code or a table code. The processor calls order data sets with a table code corresponding to the input code from the sales holding file and numbers the sets to create and store an edit data group in an edit file. One edit data set is selected and displayed on a screen display part. A data set next to the displayed edit data set can be retrieved from the edit file through one touch operation that designates a subsequent or previous slip with an input unit and displayed on the screen to thereby facilitate the retrieval of the order data with the same table code.

5 Claims, 10 Drawing Sheets

U.S. PATENT DOCUMENTS

| | | | |
|---|---|---|---|
| 2004/0143503 A1* | 7/2004 | Suthar | 705/15 |
| 2005/0043996 A1* | 2/2005 | Silver | 705/15 |
| 2005/0071232 A1* | 3/2005 | Frater | 705/16 |
| 2005/0086117 A1* | 4/2005 | Kanisawa et al. | 705/26 |
| 2005/0108116 A1* | 5/2005 | Dobson et al. | 705/30 |
| 2006/0143087 A1* | 6/2006 | Tripp et al. | 705/15 |
| 2009/0055276 A1* | 2/2009 | Dunsmore et al. | 705/15 |
| 2009/0055280 A1* | 2/2009 | Dunsmore et al. | 705/17 |

FOREIGN PATENT DOCUMENTS

| | | |
|---|---|---|
| JP | 07-296260 | 11/1995 |
| JP | 9-282562 | 10/1997 |
| JP | 10-302162 | 11/1998 |
| JP | 2003-067840 | 3/2003 |

OTHER PUBLICATIONS

Japanese Patent Office issued a Japanese Office Action dated Dec. 16, 2009, Application No. 2004-312680.

Japanese Patent Office issued a Japanese Office Action dated Jun. 16, 2010, Application No. 2004312680.

* cited by examiner

20 : ORDER SLIP

| SLIP CODE | # 01001 | ~21 |
|---|---|---|
| TABLE CODE | # 001 | ~22 |
| STORE NAME: | (SERVER) | |
| DATE AND TIME: | | |
| ITEM DATA | | ~23 |

| ITEM NAME | QUANTITY | PRICE |
|---|---|---|
| | | |
| SUBTOTAL | | |
| CONSUMPTION TAX | | |
| TOTAL | | |

FIG. 2

110 : ORDER SLIP

| SLIP CODE | # 01001 | ~111 |
| TABLE CODE | # 001 | ~112 |

STORE NAME:           (SERVER)

DATE AND TIME:

ITEM DATA                              ~113

| ITEM NAME | QUANTITY | PRICE |
|---|---|---|
|  |  |  |
| SUBTOTAL |  |  |
| CONSUMPTION TAX |  |  |
| TOTAL |  |  |

FIG. 8 PRIOR ART

SALES SLIP PROCESSOR USING SALES SLIP PROCESSING METHOD, AND STORAGE MEDIUM USED FOR SALES SLIP PROCESSING METHOD

This application claims priority to prior Japanese patent-application JP 2004-312680, the disclosure of which is incorporated herein by reference,

BACKGROUND OF THE INVENTION

1. Field of the Invention

The present invention relates to a sales slip processing at stores such as a retail store and a restaurant. In particular, the invention relates to a sales slip processing method capable of simplifying a sales slip processing that is performed by a salesclerk operating a cash register or POS (point of sales) terminal device at the restaurant, and to a sales slip processor using the method.

In the following description, a salesclerk operating a sales slip processor is referred to as a "shop operator" A slip issued for a customer in response to an order from a customer is referred to as an "order slip (order form)". Order information recorded on the order slip is referred to as "order data". The order data that is provisionally recorded until payment is referred to as "provisional data". This provisional data is called "sales data" after the payment.

2. Description of the Related Art

As conventional sales slip processing methods, Japanese Unexamined Patent Application Publication No. 10-302162 discloses a sales slip canceling method for canceling a sales slip upon the payment with a POS terminal device at a restaurant if desired.

Further, Japanese Unexamined Patent Application Publication No. 9-282562 discloses a cash register as such a terminal device, which is installed at the restaurant etc. and to which data about orders from a customer is entered, and then payment data is entered in accordance with the charges of the customer. Thus, corresponding order data is settled.

Referring now to FIGS. 7 to 10, a description is given of the sales slip processing at the restaurant as disclosed in Japanese Unexamined Patent Application Publication Nos. 10-302162 and 9-282562.

FIG. 7 illustrates an example of the block configuration of a sales slip processor typified by a cash register or POS terminal device. The sales slip processor has general image processing functions, and serves as an information processor including an input unit 101 such as a keyboard, a screen display part 102, a printer 103, a controller 104 having a central processor unit (CPU) as a main component, a software memory 105 storing a program etc., an order data holding memory 106, and a sales data storing memory 107, which are connected with one another through a bus.

FIG. 8 illustrates an example of an order slip 110 obtained by a salesclerk entering order information in a terminal (not shown) and printing the input information from a printer. The order information that is input to the terminal carried by the salesclerk is registered in the order data holding memory 106 and recorded as provisional data. The provisional data recorded in the order data holding memory 106 includes a slip code 111, a table code 112, and an item data 113 as shown in FIG. 8.

At the restaurant, in general, a salesclerk operates the sales slip processor when a customer pays the bill. The operator calls the provisional data on the basis of the slip code 111 of the order slip 110 with the input unit 101 to display the order data held in the order data holding memory 106, that is, the provisional data on a screen and confirms whether or not the display content matches the information of the order slip.

FIG. 9 is a flowchart showing an example of an operation flow of the controller 104 when a customer pays for a meal.

Upon receiving an instruction to "call provisional data" which is entered to the input unit 101 using the slip code 111 (step S101), the controller 104 searches the order data holding memory 106 for corresponding provisional data on the basis of the slip code 111 (step S102). When the provisional data matching the input slip code 111 is found (YES in step S103), the controller 104 calls and displays the provisional data on the screen display part 102 (step S104).

The shop operator compares the item data 113 displayed on the screen with the order slip of the customer, and if matched, presses a "check out" key of the input unit 101 when the customer desires to check out the bill.

After "data have matched" (YES in step S105), if receiving an instruction to "check out" from the input unit 101 (YES in step S106), the controller 104 executes predetermined processings, that is, an accounting processing for calculating the sales on the basis of the called provisional data to print the calculation result from the printer 103, and a sales registering processing for registering the sales data in the sales data storing memory 107 (step S107).

If no data is matched (NO in step S103) and the input slip code 111 matches with none of the provisional data in the order data holding memory 106, or if no data is matched (NO in step S105) and the item data 113 is not matched, the controller 104 calls the provisional data using the table code 112 in place of the slip code 111 as indicated by step S111 of FIG. 10 and subsequent steps (these steps are described below). In short, this procedure applies to the case where customers of different groups sit together at the same table at the restaurant.

Further, if there is no instruction to "check out" (NO in step S106), and the order is cancelled or another order is made, the controller 104 executes a predetermined order change processing (step S108) in accordance with an instruction from the input unit 101 and then records the called and changed data in the order data holding memory 106 as the provisional data.

FIG. 10 is a flowchart showing an example of a procedure for searching for the provisional data on the basis of the table code, not the slip code of the order slip.

Upon receiving an instruction to "call provisional data" from the input unit 101 on the basis of the table code 112 (step S111), the controller 104 searches the order data holding memory 106 for corresponding provisional data on the basis of the table code 112 (step S112). If the provisional data matching with the input table code is found (YES in step S113), the controller 114 calls and displays the provisional data on the screen display part 102 (step S114).

The shop operator compares the item data 113 displayed on the screen with the order slip of a customer, and if matched, presses the "check out" key in the input unit 101 if the customer desires to check out the bill.

After "data have matched" (YES in step S115), in response to the instruction to "check out" from the input unit 101, the controller 104 executes predetermined accounting processings, that is, an accounting processing for calculating the sales on the basis of the called provisional data to output the calculation result from the printer 103, and the sales registering processing for registering the data in the sales data storing memory part 107 (step S117).

If there is no corresponding provisional data (NO in step S113), and the input table code 112 matches with none of the provisional data in the order data holding memory 106, the controller 104 displays a predetermined alarm message indicating "no provisional data" (step S120).

Further, if data are not matched (NO in step S115), and the item data 113 is not matched, the controller 104 receives an instruction to "call provisional data" from the input unit 101 on the basis of the same table code 112 as that in step 8111 (step S121), and searches the order data holding memory 106 for provisional data of another slip code using the same table code 112 (step S122). The controller returns to step S113 and repeats subsequent steps. In this case, if the same table code cannot be matched throughout the order data holding memory 106, it is determined that there is no corresponding data (NO in step S113). Thus, an alarm message is displayed.

If there is no instruction to "check out" (NO in step S116), and the order is cancelled or another order is made, the controller 104 executes a predetermined order change processing (step S118) in accordance with an instruction from the input unit 101 and then records the called and changed data in the order data holding memory 106 as the provisional data.

As mentioned above, the salesclerk who takes on the task of operating the sales slip processor such as the POS should enter the code such as the slip code or table code with a keyboard etc. for displaying the held order information as provisional data. In order to switch the display screen from this data to other sales information, a shop operator must charge a customer for the order or rehold the currently displayed order data, and then enter a slip code or table code of the target sales information to call the provisional data.

Therefore, especially in the above case, separate tables are temporarily combined into one in response to a request from customers, and the customers are assumed as the same group. Thus, even if the order slips are separately prepared for different tables with the same table code to enter the order data, in the case where some items have been ordered, this order should be processed separately for different tables because of different slip codes irrespective of the customers of the same group. Therefore, when any item is cancelled or added from/to the order slip, it is necessary to cancel or add the item from/to each order information to hold the changed data again.

Therefore, especially upon the payment, the provisional data should be called for each of plural order slips for the same group. This forces the shop operator to perform the troublesome operation of entering the slip code or table code of several digits with a keyboard, for example, every calling operation.

The following problems remain to be solved. That is, when customers of the same group occupy plural tables at the restaurant, for example, and the plural order slips are issued with the same table code, the provisional data should be retrieved and called through the entry of the slip code or table code for each order slip at the time of the payment or data change due to the cancellation of the items, and the additional registration of items. As a result, it is impossible to simplify the operation of the shop operator.

SUMMARY OF THE INVENTION

The present invention has been completed with a view to simplifying an input operation of a shop operator at the time of retrieving and calling provisional data as held order data on the basis of a slip code or table code for each order slip upon at least the payment, even when customers of the same group occupy plural tables and order slips are created with the same table code. In principle, this table code implies the same group and so corresponds to a customer code.

It is accordingly an object of the present invention to eliminate such a troublesome operation that a salesclerk repeatedly enters a slip code or a customer code recorded on the slip when calling held order data in the plural sales slips, that is, each of provisional data with the same customer code.

In order to attain the above-described object, a sales slip processing according to the present invention has the following features.

It should be noted herein that order data representing order information on an order slip is classified as below, for the purpose of facilitating understanding of the present invention. That is, the order data that is provisionally recorded until the payment is referred to as "provisional data". The provisional data that are organized into an edit data group with the same customer rode are referred to as "edit data". To elaborate, the provisional data and the edit data are the order data, and the data assigned with the same slip code are the same. Further, the above order data differs from sales data after the payment and thus, these data are distinguished from each other.

As one aspect of the present invention, a method for creating a sales slip for one or a group of customers on the basis of a plurality of order slips with a computer system, each of the order slips being assigned to a slip code is provided. The method comprises the steps of: storing, in a memory device of the computer system, data sets of the order slips, each of the data sets being stored as a provisional data set; inputting, with an input device of the computer system, a condition for designating a group of order slips; retrieving, from the memory device with a processor of the computer system, a plurality of provisional data sets that meet the condition; and organizing with the processor, the plurality of provisional data sets as an edit data group, each of the plurality of provisional data sets corresponding to an edit data set of the edit data group. According to the method, when an operator of the computer system inputs a condition for designating a group of order slips, the processor organizes the plurality of provisional data sets that meet the condition. Therefore, the operator does not have to input each slip code to designate the provisional data sets.

The method may further comprise the steps of: is playing, on a display device of the computer system, at least a part of the edit data group; modifying the displayed part of the edit data group in accordance with operation through the input device; and creating the sales slip on the basis of the edit data group including the modified part of the edit data group with the processor. In particular, the method is effective for example when the group of customers change their order, and as a result, the operator has to modify their order slip data sets.

It is preferable that: an order relation is given to parts of the edit data group; and in response to an operation through the input device, a displayed part of the edit data group is switched to another part of the edit data group adjacent to the displayed part in the order relation.

For example, the condition is a customer code that is assigned to the customer or the group of customers and is included in each of the data sets of the order slips Table codes each of that is assigned to a table in a restaurant may be used as customer codes.

More specifically, order slips are assigned with different slip codes. Besides, customers are assigned with customer codes in a one-to-one correspondence. Further, previous/subsequent slip designating means, "subsequent slip" and "previous slip", is provided. The previous/subsequent slip designating means can designate, at the time of calling and displaying one order data held as provisional data on a screen, order data recorded next to the order data displayed on the screen through one touch operation to switch the display screen to the designated data.

To that end, at the initial stage of the sales slip processing, the data in the order slips of different slip codes are stored as provisional data in a provisional file. Following this, the plural provisional data for which the same condition is designated are called from the provisional file and numbered, and organized into an edit file as an edit data group upon at least the payment for the order. At this time, one edit data is selected from the edit data group and displayed on the screen.

That is, the previous and subsequent data adjacent to the data displayed on the screen are edit data edited into one edit file with the same customer code. Accordingly, the previous or subsequent data adjacent to the edit data displayed on the screen is retrieved from the edit file through one touch operation that designates a previous or subsequent slip, and displayed on the screen. Hence, similar order data can be called in a simple manner.

Further, as a specific structure of a sales slip processor according to the present invention, the sales slip processor is a program-controlled processor including an input/output unit, a memory, and a controller for executing a general information processing function. The sales slip processor includes; a sales holding file storing data in order slips of different slip codes as provisional data; an edit file created by organizing the plurality of provisional data for which the same condition is designated into an edit data group; and previous/subsequent slip designating means for calling previous or subsequent data next to edit data displayed on the screen through one touch operation that designates a previous or subsequent slip, and displaying the designated data on the screen.

Accordingly, the controller calls the plurality of provisional data for which the same condition, for example, a customer code is designated, from the provisional file to create the edit file, and selects and displays one edit data on the screen, at the time of calling and displaying the provisional data on the screen. Further, the controller searches for previous or subsequent data next to the edit data displayed on the screen through out touch operation that designates the previous or subsequent slip with the previous/subsequent slip designating means, and displays the designated data on the screen.

The sales slip processing method and the sales slip processor using the method collectively edit order data corresponding to all the order slips assigned with a desired customer code into the edit data group and display one edit data on the screen at the time of searching for desired order data. Thus, edit data adjacent to the displayed edit data are order data designated with the same condition, for example, order data assigned with the same customer code. Accordingly, at the time of calling edit data from the edit data group edited with the same customer code through a simple operation that designates "subsequent slip" or "previous slip" to switch the edit data displayed on the screen to the designated data, if the edit data displayed on the screen is not desired one, an operator of the processor can display desired order data on a screen in a short time by repeating a simple operation of designating previous or subsequent data or by simply calling the next edit data. That is, the sales slip processing method and sales slip processor according to the present invention produces an effect of eliminating a troublesome operation that a shop operator repeatedly enters a slip code or customer code recorded on order slips for the same customer code.

BRIEF DESCRIPTION OF THE DRAWINGS

FIG. 2 illustrates a form of an order slip used in the present invention (first embodiment);

FIG. 8 illustrates an example of a form of an order slip of FIG. 7;

DESCRIPTION OF THE PREFERRED EMBODIMENTS

In order to eliminate a troublesome operation that a shop operator repeatedly enters a slip code or customer code recorded on order slips for the same customer code when a salesclerk (operator) calls information (order data) of plural order slips with the same customer code, plural provisional data for which the same condition is designated are organized and numbered, and thus edited into an edit data group, and one edit data is selected from the edit data group and displayed on a screen at the time of calling provisional data as temporarily held order data.

Accordingly, in response to a designation of "subsequent slip" or "previous slip", edit data adjacent to the displayed edit data is called from the edit data group on the basis of the same condition, and displayed an the screen.

That is, when plural order slips are issued while assigning customer codes to customers in a one-to-one correspondence, the order data of the edit data group may be assumed as the order data for the same customer with the same condition being set as the same customer code. Hence, the shop operator has only to search for data with the customer code first, and then designates "subsequent slip" or "previous slip" through one touch operation. In this way, the operator readily processes other order slips of the same customer, making it unnecessary to enter the codes again. Hence, the troublesome operation can be eliminated.

Even if plural customer codes are set as the same condition for the order slips to be collectively processed, the order data corresponding to all the customer codes are organized into the edit data, whereby the processings can be consolidated.

First Embodiment

A first embodiment of the present invention is described with reference to FIG. 1.

Figure 1:
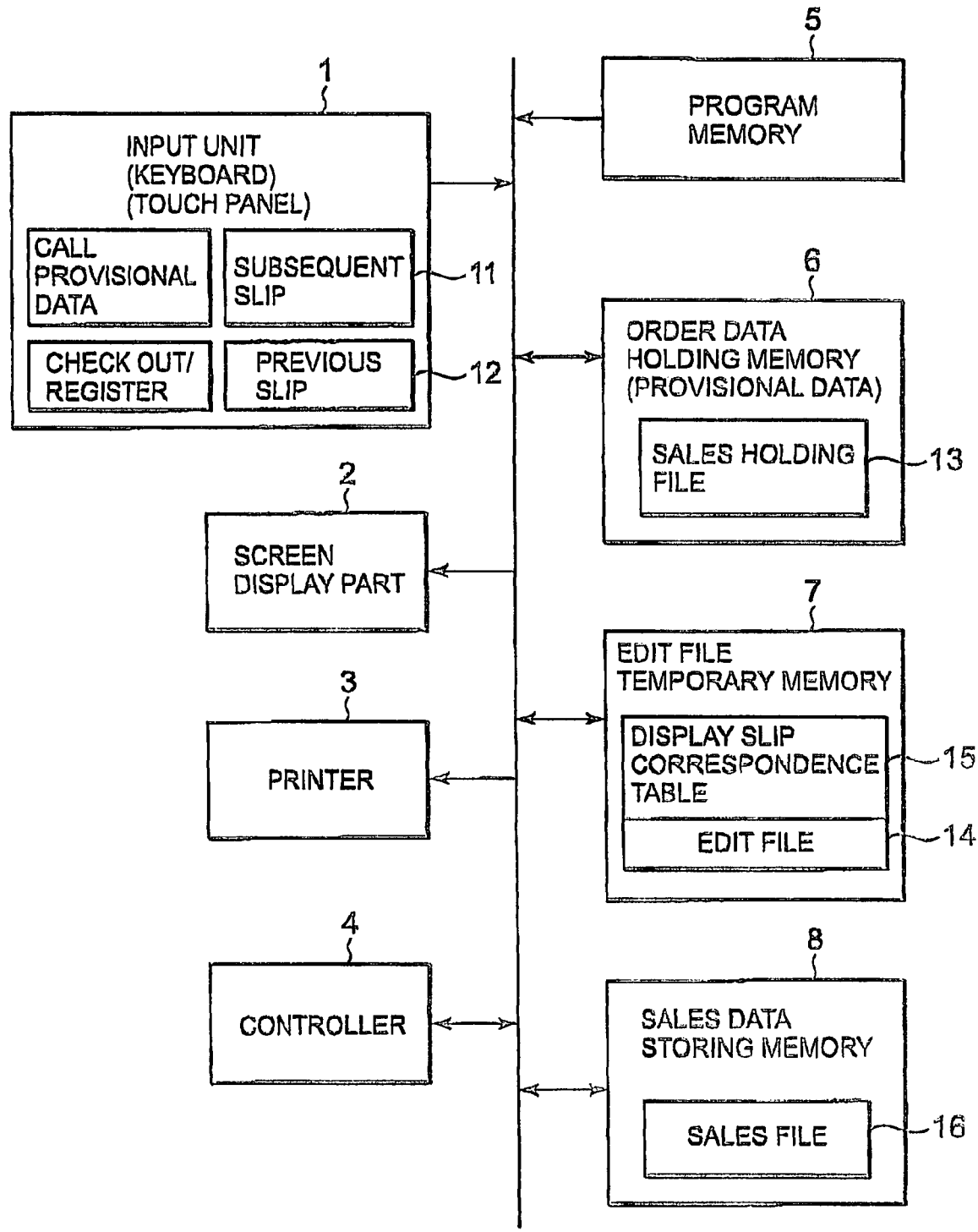
FIG. 1 illustrates the block configuration of a sales slip processor according to an embodiment of the present invention (first embodiment)

FIG. 1 illustrates a form of main components of a processor according to the present invention. The first embodiment is directed to simplify and facilitate a sales slip processing for a shop operator at the time of payment or change of plural sales slips with the same table code corresponding to one group at the restaurant.

The illustrated sales slip processor executes the ordinary image processing function, inclusive of an input unit 1, a screen display part 2, a printer 3, a controller 4, a program memory 5, an order data holding memory 6, an edit file temporary memory 7, and a sales data storing memory 8, each of which is connected with a bus and controlled by the controller 4 by means of a program.

Although not shown, the order data is input as the provisional data to a portable terminal communicable with the sales slip processor via a wireless local area network (LAN), for example. A salesclerk who takes an order carries and operates the portable terminal. The portable terminal includes an input unit, a screen display part, and a printer, and executes functions equivalent to the aforementioned input unit 1, the screen display part 2, and the printer 3. Accordingly, the data input from the terminal device is equivalent to data input from the input unit 1. The screen displaying the input data is equivalent to the screen display part 2. The sales slip printed with the printer is equivalent to a slip printed with the printer 3.

The input unit 1 notifies the controller 4 of designated information that is entered through the operation of pressing buttons of a keyboard, or the operation of touching a touch panel or an image on the screen or through a combination of these operations. Further, the input unit 1 includes keys of a "subsequent slip" 11 and a "previous slip" 12 as previous/subsequent slip designating means that enables skipping to a desired screen with one touch operation, in addition to the foregoing keys "call provisional data" and "check out/register" in the sales slip processor or POS terminal device.

Regarding the designation of "call provisional data", order data that is recorded on the order slip and stored as the provisional data in the order data holding memory 6 is retrieved from the order data holding memory 6 and displayed on a screen. If plural order slips are created with the same table code, as mentioned above, the data on the slips are organized into edit data and then displayed on the screen. Regarding the designation of "check out", the provisional data and the provisional data set called the edit data are settled and displayed on the screen. Regarding the designation of "register", the settled order data is stored as sales data in the sales data storing memory 8 and also, a receipt is issued as necessary.

Regarding the designation of "subsequent slip 11" or "previous slip 12", for example, an image displayed on the screen is touched with user's fingers or clicked with a mouse. Thus, the order data next to the order data that is being displayed on the screen is called and displayed on the screen.

The screen display part 2 displays characters, a document, an image, etc., on the display under the control of the controller 4 in response to the designation from the input unit 1. Further, the controller 4 automatically displays some items on the display on the basis of a program stored in the program memory 5. The display screen may be used as a touch panel or may serve as the input unit with a mouse.

The printer 3 prints the order slip on the portable terminal side and prints the receipt after the payment on the terminal device, for example.

The controller 4 includes a temporary working memory besides a CPU as a main component, and controls the structural components communicable with each other via a bus inclusive of the wireless local area network (LAN) on the basis of the program stored in the program memory 5 to thereby execute the sales slip processing function.

The program memory 5 stores the program that causes the controller 4 to execute the sales slip processing function and provides the stored program in response to a request.

The order data holding memory 6 stores the order data entered with the input unit 1 by the salesclerk under the control of the controller 4. For example, the order data on the order slip 20 of FIG. 2 are filed as the provisional data in a sales holding file 13.

When the designation of "call provisional data" is received from the input unit 1, and plural order data are generated with the same table code, the edit file temporary memory 7 numbers all the provisional data with the same table code, which are retrieved from the order data holding memory 6, in accordance with, for example, the slip code under the control of the controller 4, and then edits the data into an edit data group and stores the data group.

With regard to the edit data group, the edit data are recorded in numerical order of slip codes in the edit file 14. Under the control of the controller 4, the first edit data is selected and displayed on the screen display part 2. At the same time, under the control of the controller 4, the display sales slip correspondence table 15 is created in such a way that the slip codes recorded in the edit file 14 are numbered in descending order, and status (STS) information and edit file names are created for each slip code.

The sales data storing memory 8 registers and stores the sales data after the payment in a sales file 16 under the control of the controller 4.

Referring next to FIG. 2 as well as FIG. 1, a description is given of a form of the order slip 20 that is created by a salesclerk entering an order received from a customer with the input unit 1 and printing the order data from the printer 3. The format of the order slip 20 can be applied to the sales slip after the payment or the receipt.

The order data entered by the salesclerk with the input unit 1 is displayed on the screen and then printed for the customer from the printer 3 as the order slip at the completion of ordering, and also registered in the order data holding memory 6 and recorded as the provisional data in the sales holding file 13 under the control of the controller 4. The provisional data recorded in the sales holding file 13 includes a slip code 21, a table code 22, and item data 23 as shown in FIG. 2. Regarding the item data 23 as the order data, a unit price of the product is only recorded in the field of "price", for instance.

The order slip 20 is printed as a receipt for a customer when charges on a meal are figured out inclusive of the total price under the control of the controller 4. On the other hand, this data is recorded and stored in the sales file 16 of the sales data storing memory 8 as the sales slip. On the POS terminal device side, the sales data is stored in the device and also sent to a sales center via a communication line (not shown).

Figures 3, 4:
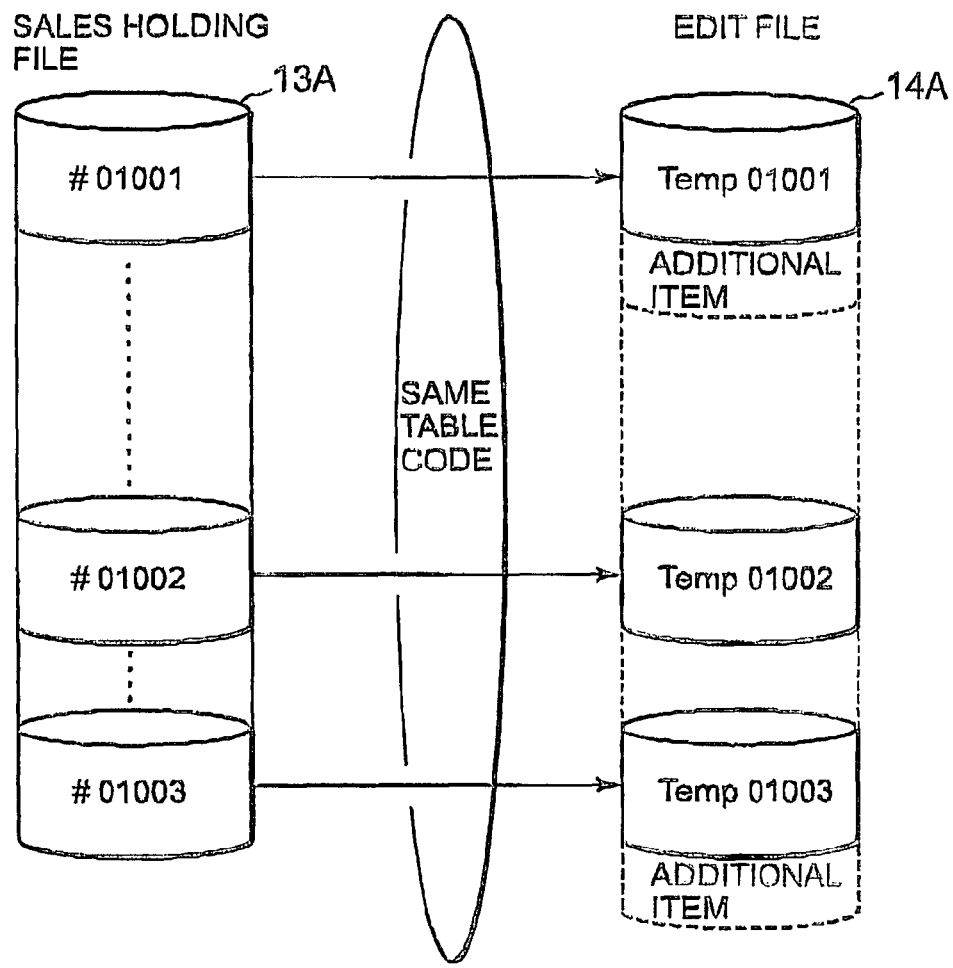
FIG. 3 illustrates a form of an edit file that is created in response to the addition of items in FIG. 1 (first embodiment)
FIG. 4 illustrates a format example of a display sales slip correspondence table in FIG. 1 (first embodiment)

Referring next to FIGS. 3 and 4 as well as FIG. 1, a description is given of how the provisional data as the order data are retrieved from the sales holding file 13 and organized into the edit file 14 as the edit data group to create the display sales slip correspondence table 15.

Figure 7:
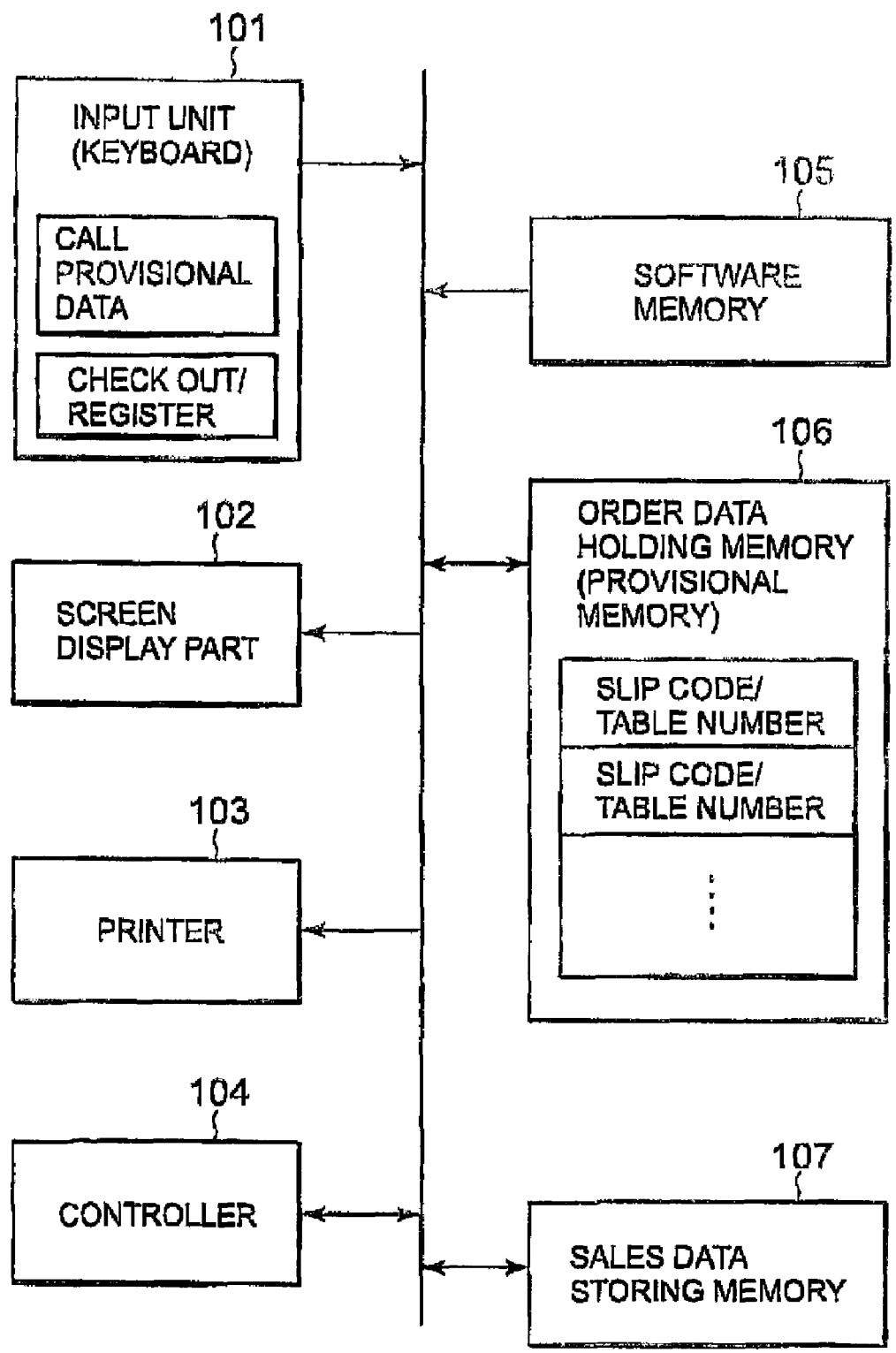
FIG. 7 illustrates the block configuration of a conventional sales slip processor.
Figure 9:
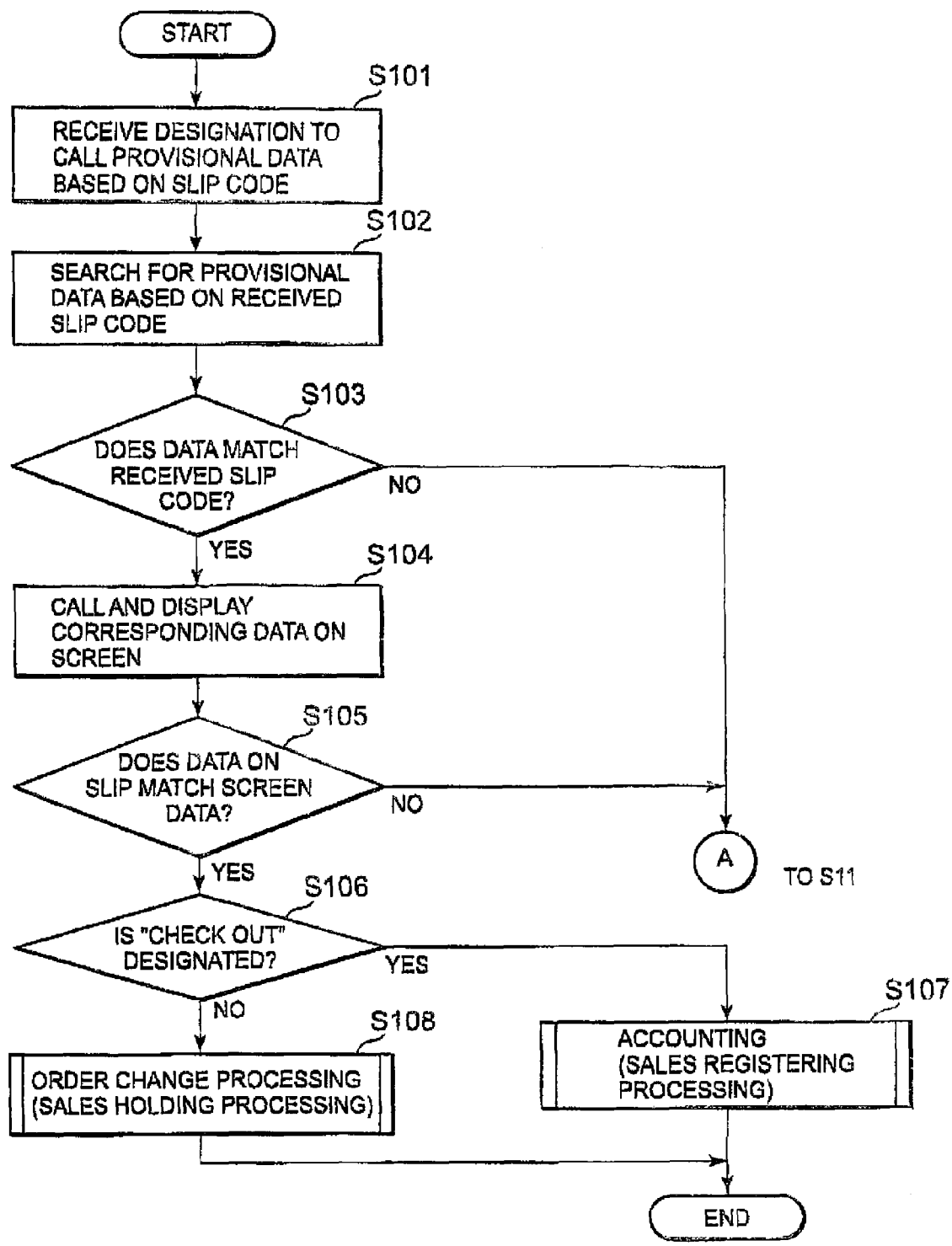
FIG. 9 is a flowchart illustrative of how a slip code is input in a main operation procedure of a controller of FIG. 7.
Figure 10:
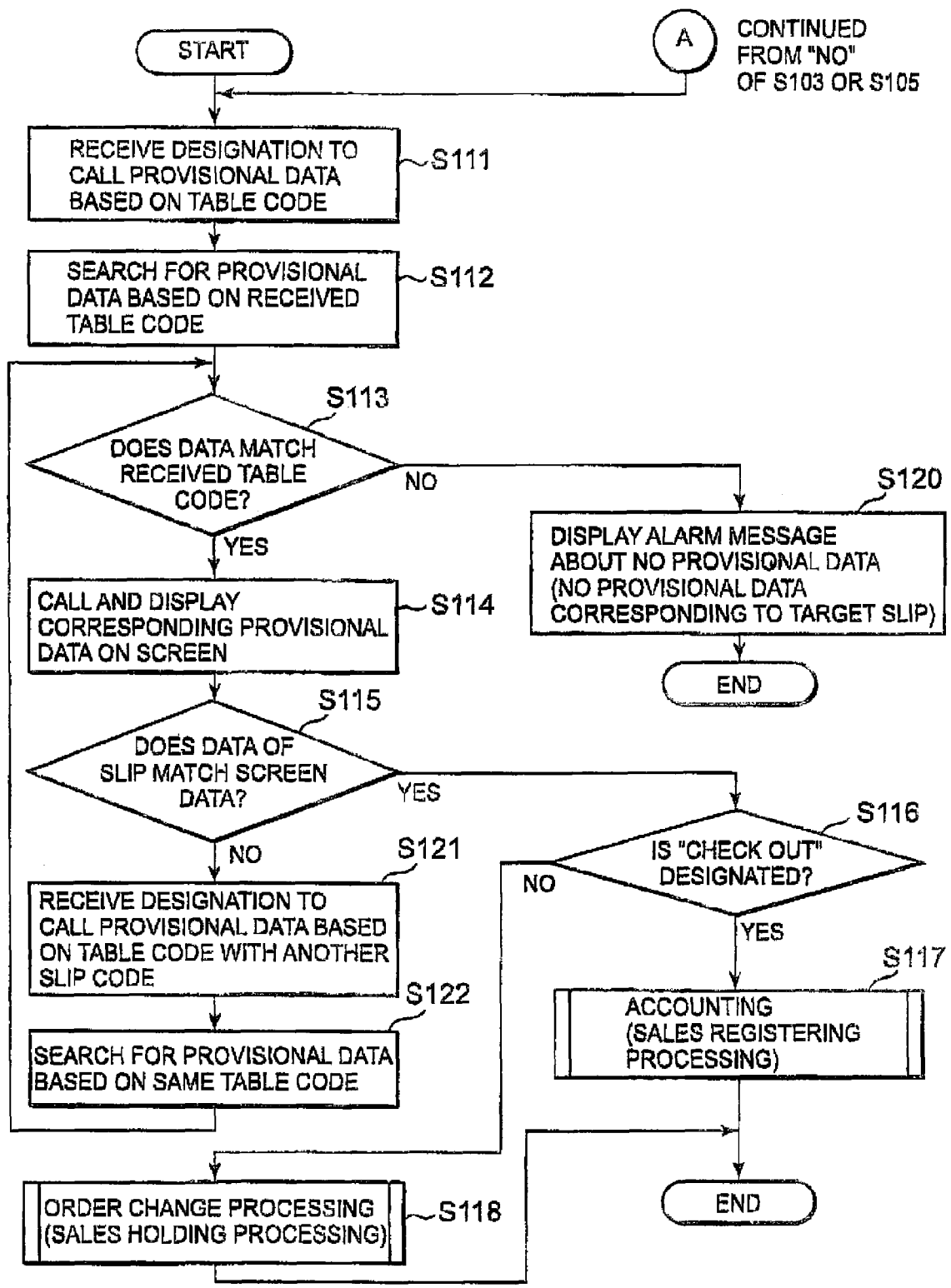
FIG. 10 is a flowchart illustrative of how a table code is input in the main operation procedure of the controller of FIG. 7.

It is assumed that the sales holding file 13 of FIG. 7 files slip codes #01001 to #01003 with the same table code #001 together with the other order data. Upon receiving the designation of "call provisional data" from the input unit 1, the controller 4 searches the sales holding file 13A for all provisional data corresponding to each of the slip codes #01001 to #01003 with the same table code #001. Then, the retrieved data are organized into the edit file 14A as the edit data group.

At this time, as shown in FIG. 4, the display sales slip correspondence table 15A is created. In the display sales slip correspondence table 15A, the slip codes #01001 to #01003 filed into the edit file 14A are numbered, and status (abbreviated to "STS") information and edit file names are created and recorded for each of the slip codes.

An STS "1" means a status that data corresponding to a target slip code is "being displayed on the screen". For example, in response to the designation of "subsequent slip" from the input unit 1, the STS of the next slip code #01002 is set to "1", and data corresponding to the slip code #01002 is displayed on the screen display part 2. That is, the STS of the next code is set to "1" with the means for designating the previous/subsequent slip with the input unit 1, and the data corresponding to the STS "1" is displayed on the screen.

As illustrated in the edit file 14A of FIG. 3, if some item is added to the order slip, the item is added to the edit data displayed on the screen. On the other hand, if some item is cancelled, the item is deleted from the data.

Figure 5:
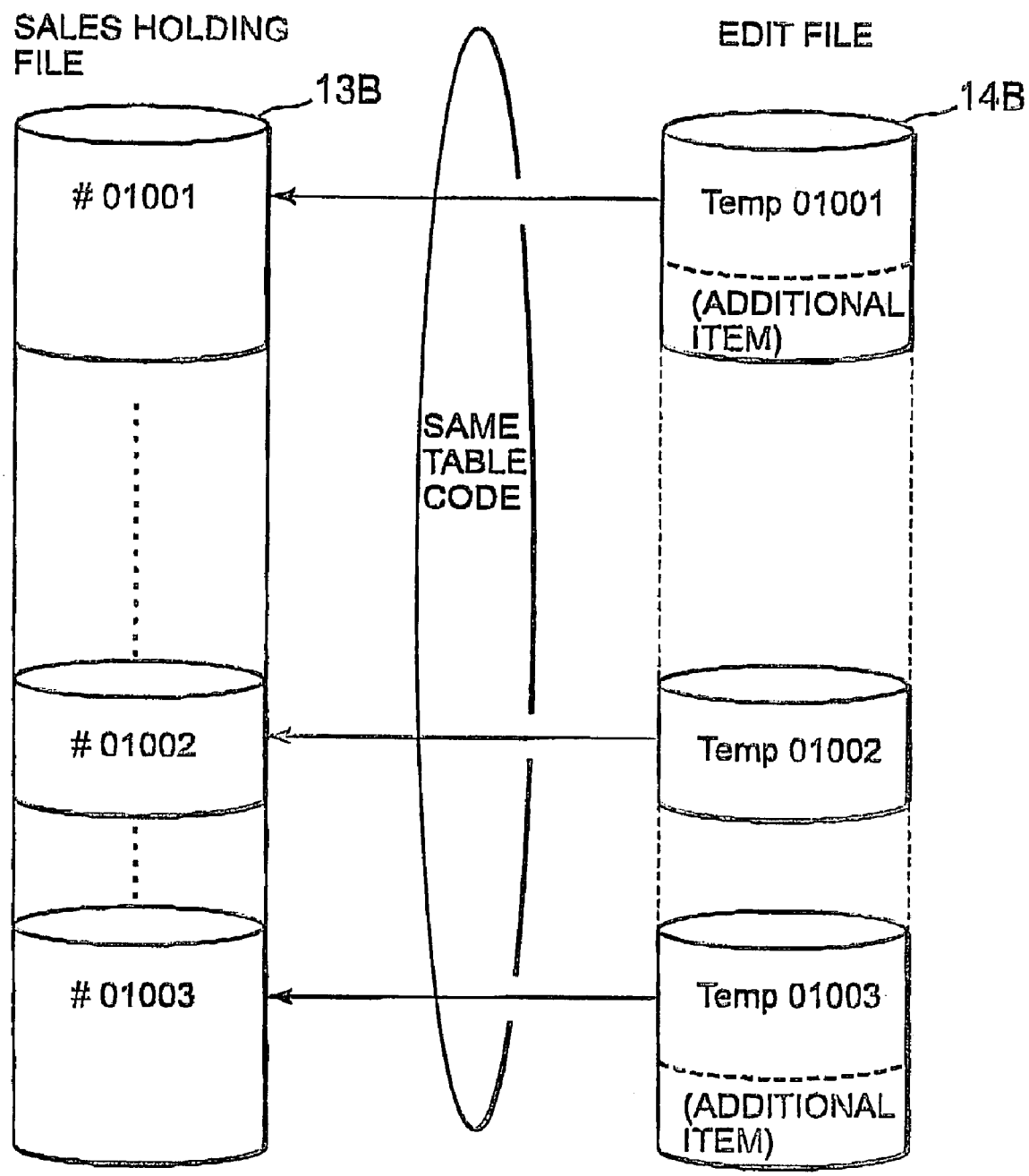
FIG. 5 illustrates a form of a temporary file that is created after the edit file is changed in FIG. 1 (first embodiment)

FIG. 5 shows an edit file 14B obtained by adding some item to the edit file 14A. At the completion of the editing processing, the edit file 14B is sent back to the order data holding memory 6 and incorporated into the sales holding file 13B as shown in FIG. 5.

Figure 6A:
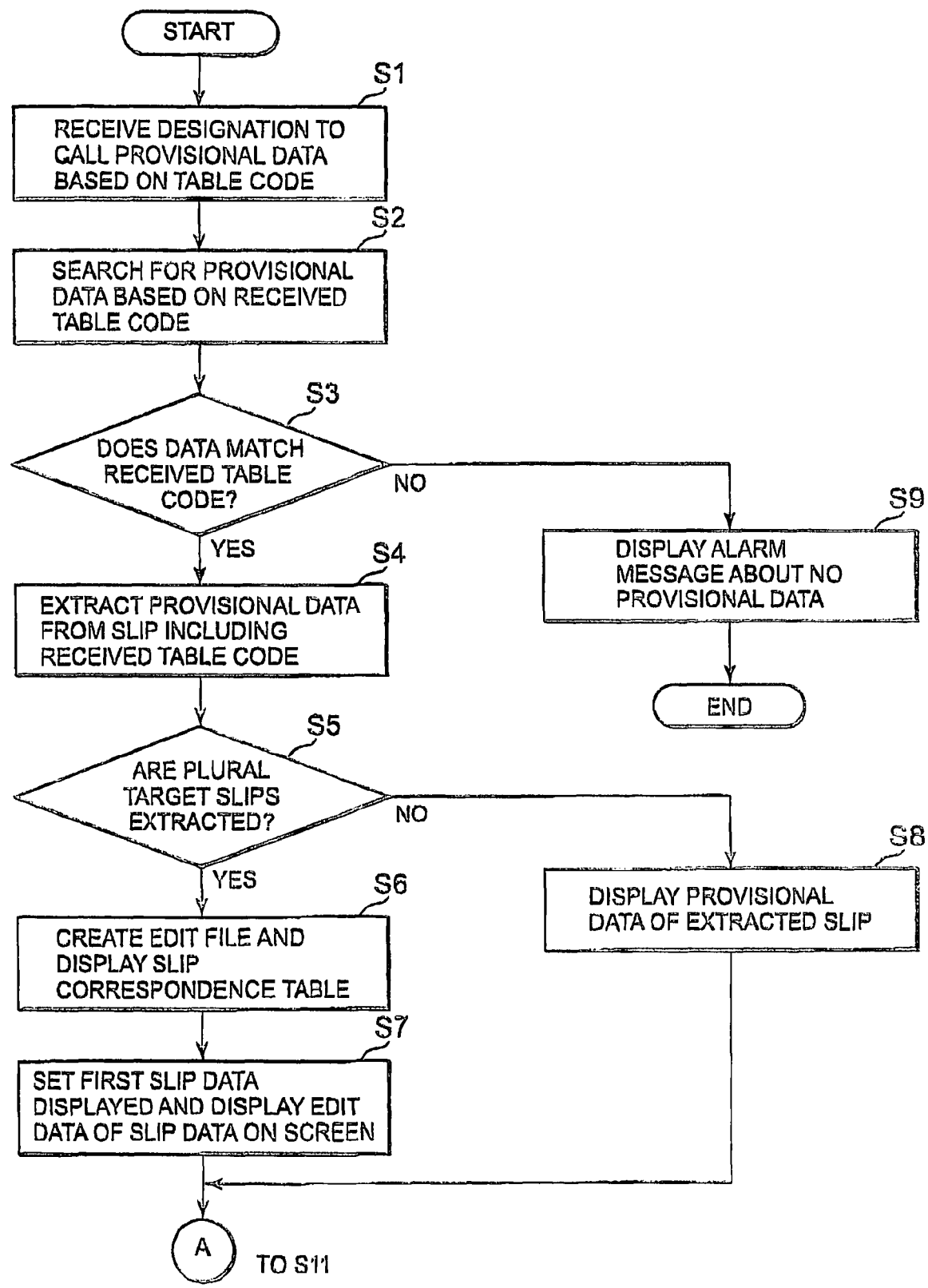
FIG. 6A is a flowchart showing the first half of the main operation procedure of the controller of FIG. 1 according to the embodiment of the invention (first embodiment)
Figure 6B:
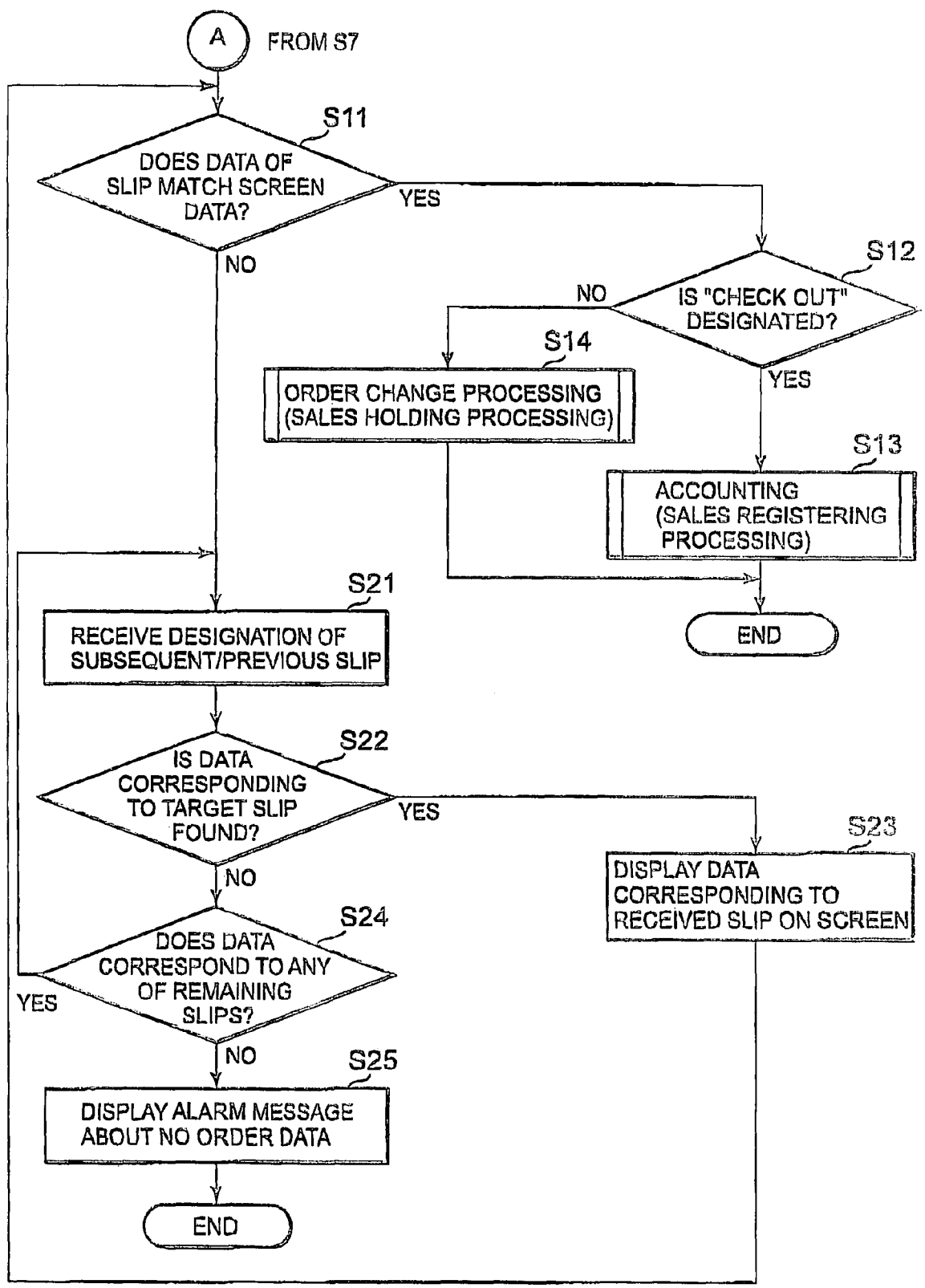
FIG. 6B is a flowchart showing the second half of the main operation procedure of FIG. 1, which follows the operation of FIG. 6A according to the embodiment of the invention (first embodiment)

Referring next to FIGS. 6A and 6B as well as FIG. 1, an operation procedure according to the present invention is described. FIGS. 6A and 6B are flowcharts showing a main operation procedure of the controller 4 according to the embodiment of the present invention.

When a customer checks out the bill, a salesclerk makes a designation to call provisional data with the input unit 1 of the sales slip processor and also enters the table code #001, for example.

When receiving the designation to call provisional data and the entry of the table code #001 from the input unit 1 (step S1), the controller 4 searches the sales holding file 13 for all provisional data assigned with the same table code #001, on the basis of the received table code #001 (step S2).

If provisional data assigned with the table code #001 is found as the result of search (YES in step S3), the controller 4 extracts the found provisional data (step 84). If plural provisional data are extracted (plural extracted slips) (YES in step S5), the controller 4 numbers and organizes the plural provisional data into the edit file 14 of the edit file temporary memory 7 to collectively file the plural data as the edit data group and create the display sales slip correspondence table 15 (step S6). In addition, the edit data associated with the first slip code is set to STS "1" and thus displayed on the screen display part 2 (step S7).

If the number of target slips is 1 (NO in step S5), provisional data corresponding to the extracted slip is displayed on the screen (step S8).

Through the display on the screen in steps S7 and S8, the salesclerk compares the display content with the order slip of a customer by use of the sales slip processor, and if matched (YES in step S11), designates the "check out" with the input unit 1.

After the product information is matched (YES in step S11), in response to the designation of "check out" (step S12), the controller 4 executes a normal accounting processing (step S13) to end the procedure. The normal accounting processing is such that a subtotal, a consumption tax, and the total price are computed from the unit price and number of items to complete the sales date and display the data on the screen display part 2, for example. Next, if the designation of "register" is received after confirming the screen, the sales data is printed as a receipt from the printer 3 and also recorded and saved in the sales file 16 of the sales data storing memory 8.

If no designation of "check out" is received (NO in step S12), and some item is deleted or added, a normal order change processing is executed (step S14) to end the processing. The normal order change processing is such that if some items are added as described above with reference to FIG. 3, the name or number of items is added on the display screen to change the edit data. Next, as described above with reference to FIG. 5, the thus-changed edit data is recorded as the provisional data in the sales holding file 13 of the order data holding memory 6.

If the product information displayed on the screen is not matched with that of the slip (NO in step S11), a salesclerk designates the subsequent slip 11 or the previous slip 12 with the input unit 1.

When receiving the designation of the subsequent slip 11 or the previous slip 12 from the input unit 1 (step S21), the controller 4 determines whether or not there is data corresponding to a slip code that matches with the designation (step S22).

Since the edit data is displayed on the screen in step S7, if the edit data corresponding to the target slip code is "found" (YES in step S22), the edit data is displayed on the screen (step S23). Then, the processing returns to step S11, and the same procedure is repeated until the data of the slip matches the data on the screen.

If no edit data corresponding to the target slip code is found (NO in step S22), the processing returns to step S21 under the condition that the edit data corresponds to any of the remaining slip codes (YES in step S24), and the same procedure is repeated. If the edit data corresponds to none of the remaining slip codes (NO in step S24), the controller 4 displays an alarm message indicative of no order data on the screen (step S25).

Since the provisional data in the sales holding file 13 is displayed on the screen in step S8, if the operator designates the subsequent slip 11 or the previous slip 12 with the input unit 1 in step S21, the provisional data about the thus-designated adjacent slip can be displayed on the screen. To designate the subsequent slip 11 or the previous slip 12 as above, designating means such as icons "next" and "back" displayed on a computer screen may be used.

Since the search range of corresponding data is limited to the edit data in step S24, even if the operator tries to search memory areas outside the edit file 14 for the corresponding data, an alarm message indicative of no order data is immediately displayed (in step S25) without repeating the procedure.

Owing to the aforementioned structure, even if customers of the same group occupy plural tables, and plural sales slips are printed with the same table code, the order data on the plural order slips assigned with the same table code can be organized into the edit file as the edit data group. Hence, the data about the orders from the customers can be readily retrieved only by designating the subsequent or previous slip, which produces an effect of promptly responding to a request to change the order or check out the bill with a simple operation.

This is applicable to the case where customers of the same group individually pay for a meal. Even if the slip codes are not serial ones, the order data can be organized into the edit file under the same conditions, so the orders can be sequentially settled with ease in a short period.

In the above description, the order is received or changed with the input unit 1 of the processor. However, even the portable terminal of the salesclerk can execute the functions of the input unit 1 and screen display part 2, so similar beneficial effects can be attained with the use of the portable terminal.

Second Embodiment

Another embodiment of the present invention is applicable to general stores.

More specifically, this embodiment is applied to the case where plural order slips are created for a single customer with one customer code to attain similar effects.

Further, even if the orders are collectively settled together with slips with different customer codes or slip codes, for example, the slips are organized into the edit file on the basis of the customer codes to thereby facilitate the order change and collective payment albeit not as easy as the above example.

According to the present invention, in the case of creating plural order slips under specific conditions, for example, conditions that customers are assigned with customer codes in a one-to-one correspondence, order data assigned with the same specific condition are detected and organized into the edit data group. Thus, the adjacent slip data can be promptly extracted with ease on the basis of the edit data group. Accordingly, the present invention is not limited to the order data assigned with the same customer code but is applicable to such a sales slip processing that order data of any group are promptly detected with ease to change the order or check out the bill not only at the restaurant but at general stores by searching for corresponding data within a limited range on the basis of common specific conditions such as a specific customer code, and organizing the obtained data into the edit data group.

What is claimed is:

1. A sales slip processor for creating an order slip on the basis of an order received from a customer and setting the order to create and print a sales slip, comprising:
    a first memory including a provisional file for storing a plurality of provisional data corresponding to a plurality of order slips, wherein the first memory is configured to store each of the plurality of provisional data in association with a corresponding order slip of the plurality of order slips, each order slip having a different slip code, wherein the first memory is also configured to store at least two of the plurality of provisional data corresponding with order slips having different slip codes as being designated as having a same condition;
    a second memory configured for storing an edit file created by organizing the plurality of provisional data corresponding to the plurality of order slips for which the same condition has been designated, into an edit data group;
    an input unit including previous slip designating means and subsequent slip designating means for calling any one of previous or subsequent data next to edit data displayed on a screen through one touch operation that designates a previous or subsequent data slip and displaying the called data on the screen; and
    a controller having a central processing unit for calling, at a time of calling and displaying the provisional data on the screen, the plurality of provisional data for which the same condition is designated, from the provisional file, organizing the plurality of provisional data into the edit file, so that different slip codes having a same condition are organized together into the edit group to edit collectively, and selecting and displaying one edit data out of the edit data group on the screen to search the edit file for the previous or subsequent data next to the edit data displayed on the screen through one touch operation that designates a previous or subsequent data slip with a corresponding previous slip designating means or subsequent slip designating means, and display the data on the screen.

2. The sales slip processor according to claim 1, wherein the condition for organizing the provisional data into the edit file as the edit data group is a payment or change of the order.

3. The sales slip processor according to claim 1, wherein the same condition designated is one of a customer code and a table code designated at a restaurant.

4. The sales slip processor according to claim 1, wherein the sales slip processor functions as POS terminal incorporated into a POS system.

5. A non-transitory computer-readable storage medium storing a program that causes a sales slip processor to executing to execute a sales slip processing, the sales slip processor including:
    a first memory including a provisional file for storing a plurality of provisional data corresponding to a plurality of order slips, wherein the first memory is configured to store each of the plurality of provisional data in association with a corresponding order slip of the plurality of order slips, each order slip having a different slip code, wherein the first memory is also configured to store at least two of the plurality of provisional data corresponding with order slips having different slip codes as being designated as having a same condition;
    a second memory configured for storing an edit file created by organizing the plurality of provisional data corresponding to the plurality of order slips for which the same condition has been designated, into an edit data group;
    an input unit including previous slip designating means and subsequent slip designating means for calling any one of previous or subsequent data next to edit data displayed on a screen through one touch operation that designates a previous or subsequent data slip and displaying the called data on the screen; and
    a controller having a central processing unit for calling, at a time of calling and displaying the provisional data on the screen, the plurality of provisional data for which the same condition is designated, from the provisional file, organizing the plurality of provisional data into the edit file, so that different slip codes having a same condition are organized together into the edit group to edit collectively, and selecting and displaying one edit data out of the edit data group on the screen to search the edit file for the previous or subsequent data next to the edit data displayed on the screen through one touch operation that designates a previous or subsequent data slip with a corresponding previous slip designating means or subsequent slip designating means, and display the data on the screen.

* * * * *